(12) United States Patent
Fang

(10) Patent No.: US 9,116,388 B2
(45) Date of Patent: Aug. 25, 2015

(54) BACKLIGHT MODULE AND LIQUID CRYSTAL DISPLAY

(75) Inventor: Kuojun Fang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/511,702

(22) PCT Filed: Apr. 10, 2012

(86) PCT No.: PCT/CN2012/073705
§ 371 (c)(1),
(2), (4) Date: May 24, 2012

(87) PCT Pub. No.: WO2013/149405
PCT Pub. Date: Oct. 10, 2013

(65) Prior Publication Data
US 2015/0023002 A1    Jan. 22, 2015

(30) Foreign Application Priority Data

Apr. 5, 2012   (CN) .......................... 2012 1 0098529

(51) Int. Cl.
*G09F 13/04* (2006.01)
*G02F 1/1335* (2006.01)

(52) U.S. Cl.
CPC ........ *G02F 1/133615* (2013.01); *G02F 1/1335* (2013.01)

(58) Field of Classification Search
CPC   G02F 1/133615; G02B 6/002; G02B 6/0031; G02B 6/0058; G02B 5/10
USPC ........................ 362/97.1, 97.3, 241, 347, 350
See application file for complete search history.

(56) References Cited

U.S. PATENT DOCUMENTS

| | | | |
|---|---|---|---|
| 2010/0172152 A1* | 7/2010 | Boonekamp | 362/609 |
| 2011/0134659 A1* | 6/2011 | Aastuen et al. | 362/609 |
| 2012/0250293 A1* | 10/2012 | Jeong et al. | 362/97.2 |

* cited by examiner

*Primary Examiner* — Andrew Coughlin
(74) *Attorney, Agent, or Firm* — Mark M. Friedman

(57) ABSTRACT

A backlight module and a liquid crystal display are provided. The backlight module includes an optical film, a reflection member and a light-emitting unit. A reflection surface of the reflection member includes multiple side edges. The light-emitting unit is disposed on one intersection position formed by the side edges of the reflection surface, and a light-emitting direction of the light-emitting unit faces the reflection surface. The reflection surface has a default track, whereby the lights emitted from the light-emitting unit can be projected to the reflection surface, and then uniformly entering into the optical film after being reflected by the reflection surface.

12 Claims, 3 Drawing Sheets

BACKLIGHT MODULE AND LIQUID CRYSTAL DISPLAY

BACKGROUND OF THE INVENTION

1. Field of the Invention

The present invention relates to a liquid crystal displaying technology field, and more particularly to a backlight module and a liquid crystal display.

2. Description of the Prior Art

With the continuous development of a liquid crystal display, the demand for the function of every component of the liquid crystal display becomes more and more high.

Please refer to FIG. 1, FIG. 1 is a top plane schematic view of a backlight module of the prior art.

The backlight module includes an optical film 11 and light sources 12. The light sources 12 may be evenly arranged near one side edge or multiple side edges of the optical film 11 according to the actual optical needing. FIG. 1 only shows that the light sources 12 are arranged near one side edge of the optical film 11.

Obviously, the above arrangement of the light sources 12 needs to employ more light sources 12, so this arrangement not only increases cost, but also can increases the length or width of the backlight module and limit the developing trend of the narrow frame backlight module because the multiple light sources 12 are in parallel arranged near one side edge of the optical film 11 and occupy a large space.

Moreover, for the light sources 12 of the prior art, generally, only one or two LEDs (Light-emitting Diode) can satisfy the requirement of luminous flux of the backlight module.

Hence, it is one research direction in the liquid crystal displaying technology field that how to reasonable arranging the light sources for not only reducing the number of the light sources, reducing cost and saving space, but also ensuring to accord with the requirement of the luminous flux of the backlight module.

BRIEF SUMMARY OF THE INVENTION

One object of the present invention is to provide a backlight module, which can reasonable arrange the light sources for reducing the number of the light sources, reducing cost, saving space, and ensuring to accord with the requirement of the luminous flux of the backlight module.

For solving above problems, the present invention provides a backlight module, which can reasonable arrange the light sources, thereby reducing the number of the light sources, reducing cost, saving space, and ensuring to accord with the requirement of the luminous flux of the backlight module.

To achieve the aforementioned object of the present invention, the present invention provides a backlight module comprising an optical film, a reflection member and two light-emitting units, each of the two light-emitting units includes a light source and a reflection cover, the light source is long bar-shaped, the reflection member is located under the optical film and parallel to the optical film, the reflection member includes a reflection body and a reflection surface on the top of the reflection body, the reflection surface includes multiple side edges, wherein:

the two light-emitting units are separately disposed on intersection positions of the side edges of the reflection surface, the light-emitting directions of the two light-emitting units faces the reflection surface;

the reflection surface is designed to be a free curved surface having a default track, the lights emitted from the two light-emitting units can be projected to the reflection surface and then uniformly enter into the optical film after being reflected by the reflection surface.

In the backlight module of the present invention, the light source includes a light-emitting surface, which is parallel to the optical film and faces the reflection cover and the reflection surface; and the reflection cover is used to reflect the lights coming from the light source unto the reflection surface or the optical film.

In the backlight module of the present invention, a top plane structure of the reflection surface is square, including two opposite parallel long side edges and two opposite parallel short side edges, wherein the four side edges form four intersection positions;

the two light-emitting units are separately disposed at two opposite intersection positions of the four intersection positions.

In the backlight module of the present invention, a top plane structure of the reflection surface is squared, including two opposite parallel long side edges and two opposite parallel short side edges, wherein the four side edges form four intersection positions.

the light incidence angle increases with the increase of the specific value.

In the backlight module of the present invention, there forms a vertical distance from any point on the reflection surface to the vertical plane, and any point on the reflection surface has a height relative to a bottom surface of the reflection member, wherein the height of any point on the reflection surface decreases with the increase of the vertical distance from it to the vertical plane, the downward trend of the height is greater on the position near the light source, and the downward trend of the height is slower on the position far from the light source.

Another object of the present invention is to provide a backlight module, which can reasonable arrange the light sources for reducing the number of the light sources, reducing cost, saving space, and ensuring to accord with the requirement of the luminous flux of the backlight module.

To achieve the aforementioned object of the present invention, the present invention provides a backlight module comprising an optical film, a reflection member and at least one light-emitting unit, the reflection member is located under the optical film and parallel to the optical film, the reflection member includes a reflection body and a reflection surface on the top of the reflection body, the reflection surface includes multiple side edges;

the light-emitting unit is disposed on one intersection position formed by the side edges of the reflection surface, a light-emitting direction of the light-emitting unit faces the reflection surface; the reflection surface is designed to be a free curved surface having a default track, the lights emitted from the light-emitting unit can be projected to the reflection surface and then uniformly enter into the optical film after being reflected by the reflection surface.

In the backlight module of the present invention, the light-emitting unit includes a light source and a reflection cover; the light source includes a light-emitting surface, which is parallel to the optical film and faces the reflection cover and the reflection surface; and the reflection cover is used to reflect the lights coming from the light source unto the reflection surface or the optical film.

In the backlight module of the present invention, a top plane structure of the reflection surface is square, including two opposite parallel long side edges and two opposite parallel short side edges, wherein the four side edges form four intersection positions; the backlight module includes two light-emitting units, which are separately disposed at two opposite intersection positions of the four intersection positions.

In the backlight module of the present invention, the light source is a long bar-shaped, the light-emitting surface of the light source is perpendicular to a vertical plane being perpendicular to the reflection member; there forms a light incidence angle between the vertical plane and the short side edge of the reflection surface, the range of the light incidence angle is from 0 to $\pi/2$; the length of the short side edge and the length of the long side edge form a specific value; the light incidence angle increases with the increase of the specific value.

In the backlight module of the present invention, a top plane structure of the reflection surface is squared, including two opposite parallel long side edges and two opposite parallel short side edges, wherein the four side edges form four intersection positions; the backlight module includes two light-emitting units, which are separately disposed at two opposite intersection positions of the four intersection positions.

Another object of the present invention is to provide a liquid crystal display, which can reasonable arrange the light sources for reducing the number of the light sources, reducing cost, saving space, and ensuring to accord with the requirement of the luminous flux of the backlight module.

To achieve the aforementioned object of the present invention, the present invention provides a liquid crystal display comprising a backlight module. The backlight module comprises an optical film, a reflection member and at least one light-emitting unit, the reflection member is located under the optical film and parallel to the optical film, the reflection member includes a reflection body and a reflection surface on the top of the reflection body, the reflection surface includes multiple side edges;

the light-emitting unit is disposed on one intersection position formed by the side edges of the reflection surface, a light-emitting direction of the light-emitting unit faces the reflection surface;

the reflection surface is designed to be a free curved surface having a default track, the lights emitted from the light-emitting unit can be projected to the reflection surface and then uniformly enter into the optical film after being reflected by the reflection surface.

In the liquid crystal display of the present invention, the light-emitting unit includes a light source and a reflection cover; the light source includes a light-emitting surface, which is parallel to the optical film and faces the reflection cover and the reflection surface; and the reflection cover is used to reflect the lights coming from the light source unto the reflection surface or the optical film.

In the liquid crystal display of the present invention, a top plane structure of the reflection surface is square, including two opposite parallel long side edges and two opposite parallel short side edges, wherein the four side edges form four intersection positions; the backlight module includes two light-emitting units, which are separately disposed at two opposite intersection positions of the four intersection positions.

In the liquid crystal display of the present invention, the light source is a long bar-shaped, the light-emitting surface of the light source is perpendicular to a vertical plane being perpendicular to the reflection member; there forms a light incidence angle between the vertical plane and the short side edge of the reflection surface, the range of the light incidence angle is from 0 to $\pi/2$; the length of the short side edge and the length of the long side edge form a specific value; the light incidence angle increases with the increase of the specific value.

In the liquid crystal display of the present invention, a top plane structure of the reflection surface is squared, including two opposite parallel long side edges and two opposite parallel short side edges, wherein the four side edges form four intersection positions; the backlight module includes two light-emitting units, which are separately disposed at two opposite intersection positions of the four intersection positions, Comparing with the prior art, in the backlight module and the liquid crystal display of the present invention, the light-emitting unit is located at the intersection position of the side edges of the reflection surface, the reflection surface is designed according to the default track, the default track is matched with the light-emitting unit located at the intersection position, whereby the lights emitted from the light-emitting unit can be reflected to the optical film. Obviously, the present invention adopts a less number of the light-emitting units for reducing cost, saving space and ensuring to accord with the requirement of the luminous flux of the backlight module.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the present invention.

Figure 1:
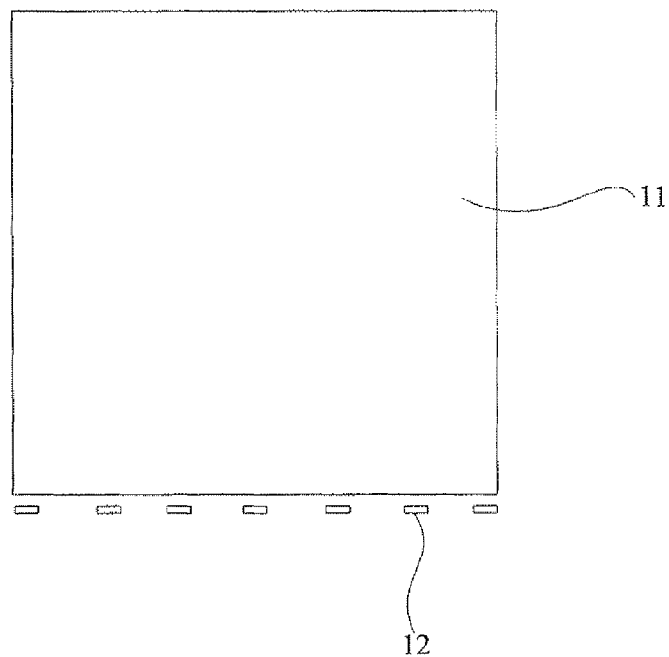
FIG. 1 is a top plane schematic view of a backlight module of the prior art.
Figure 2:
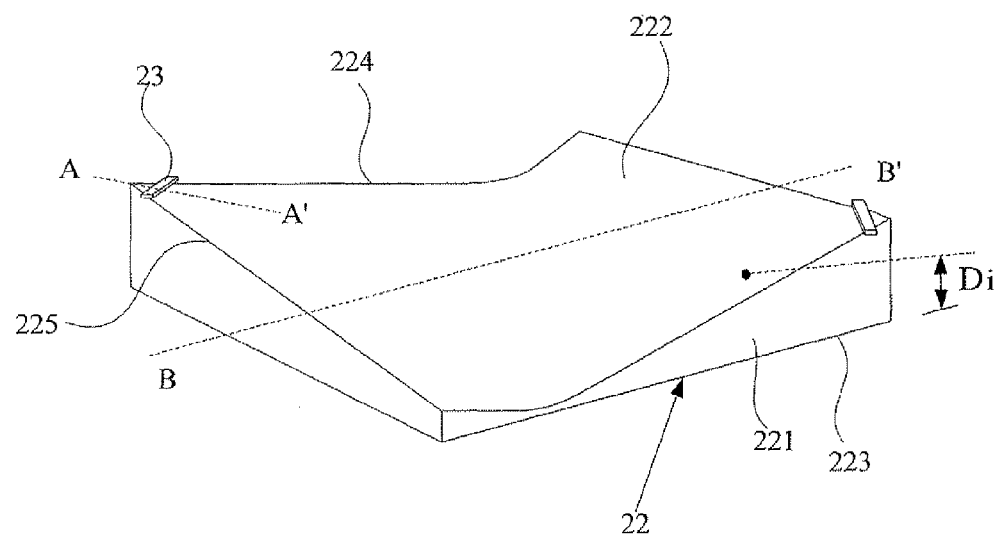
FIG. 2 is a schematic view of the position relationship between a reflection member and a light source in a backlight module of the present invention.
Figure 3:
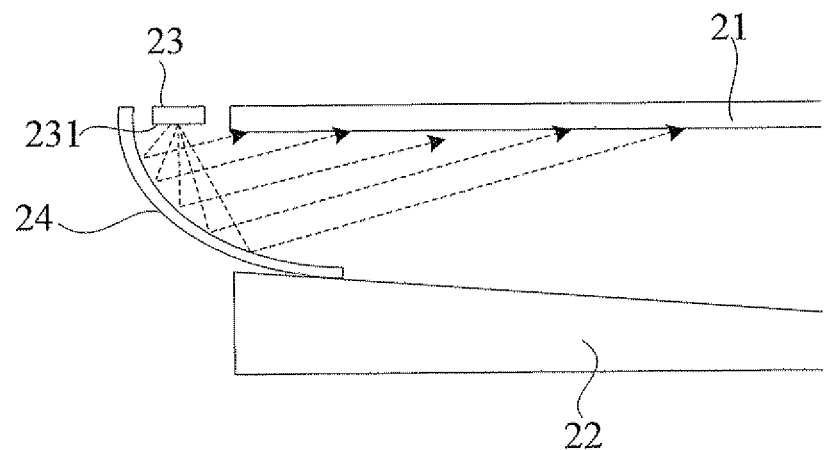
FIG. 3 is a cross sectional schematic view along a broken line A-A' shown in FIG. 2, and FIG. 3 further shows the relative position of a reflection cover, the light source, an optical film and the reflection member in the backlight module of the present invention.

Please refer to FIG. 2 and FIG. 3, a backlight module provided by the present invention includes an optical film 21, a reflection member 22 and at least one light-emitting unit (not shown in drawing). The light-emitting unit includes a light source 23 and a reflection cover 24 (FIG. 3). The reflection member 22 is located under the optical film 21 and is parallel to the optical film 21. The reflection member 22 includes a reflection body 221, a reflection surface 222 on the top of the reflection body 221, and a bottom surface 223 on the bottom of the reflection body 221.

Figure 4:
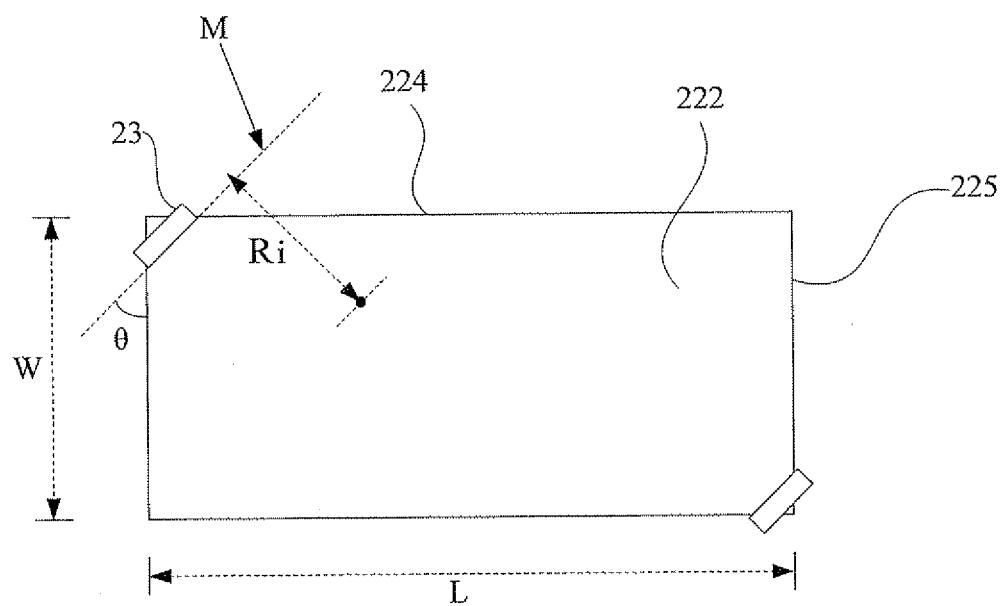
FIG. 4 is a top plane schematic view of a reflection surface and the light source in the backlight module of the present invention.

Please refer to FIG. 4, FIG. 4 is a top plane schematic view of the reflection surface 222 and the light source 23. The top plane structure of the reflection surface 222 is square, including two opposite parallel long side edges 224 and two opposite parallel short side edges 225.

Please refer to FIG. 3, FIG. 3 is a cross sectional schematic view along a broken line A-A' shown in FIG. 2, and FIG. 3 further shows the relative position of the reflection cover 24, the light source 23, the optical film 21 and the reflection member 22.

Please refer to FIG. 4, FIG. 4 is a top plane schematic view of the reflection surface 222 and the light source 23. The top plane structure of the reflection surface 222 is squared, including two opposite parallel long side edges 224 and two opposite parallel short side edges 225.

Please refer to FIG. 4 again, the two long side edges 224 and the two short side edges 225 of the reflection surface 222 form four intersection positions. Two light-emitting units (FIG. 4 only shows the light sources 23 of the light-emitting units) are separately disposed at two opposite intersection positions on the reflection surface 222. Of course, in the specific implementation process, the light-emitting units may also be disposed at one or more intersection positions on the reflection surface 222 according to the actual optical demand. Therefore, the present invention does not limit the actual number of the light source 23 and the specific intersection position where the light source 23 is located.

In this embodiment, the light source 23 is long bar-shaped, for example, a light-emitting diode. The light-emitting surface 231 is perpendicular to a vertical plane M, which is perpendicular to the bottom surface 223 of the reflection member 22. There forms a vertical distance Ri from any point on the reflection surface 222 to the vertical plane M, and any point on the reflection surface 222 has a height Di relative to the bottom surface 223.

In this embodiment, the reflection surface 222 is a free curved surface having a default track. More specifically, please refer to FIG. 2, the default track has such feature: the height Di of any point on the reflection surface 222 decreases with the increase of the vertical distance Ri from it to the vertical plane M.

Figure 6:
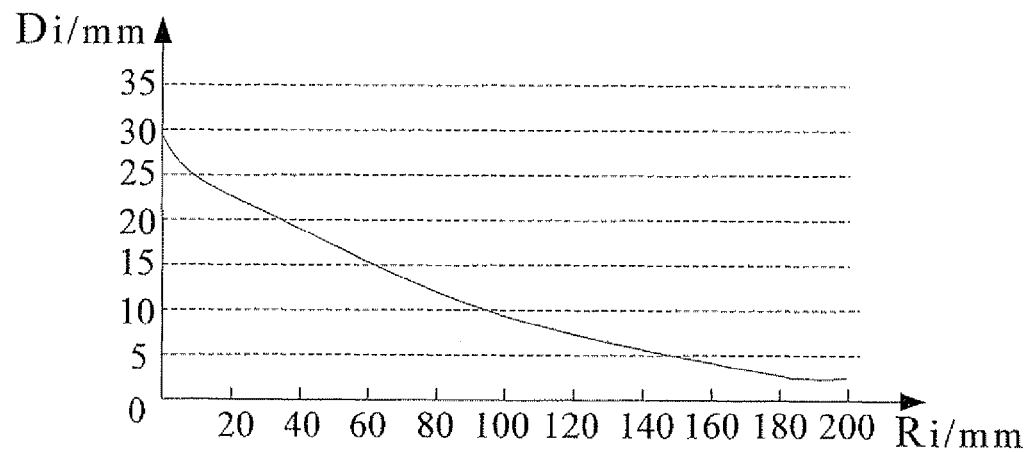
FIG. 6 is a schematic view of a change curve of the height of any point on the reflection surface of the reflection member with the vertical distance thereof.

Please refer to FIG. 6, FIG. 6 is a schematic view of a change curve between the height Di and the vertical distance Ri. It can be seen from FIG. 6 that, on the reflection surface 222, the change ratio of the height Di is gradually decreasing with the increase of the vertical distance Ri. Namely, the downward trend of the height Di of the reflection surface 222 is greater on the position near the light source 23, and the downward trend of the height Di of the reflection surface 222 is slower on the position far from the light source 23.

Please refer to FIG. 4 again, the length W of the short side edge 225 and the length L of the long side edge 224 of the reflection surface 222 form a specific value μ equal to W/L. There forms a light incidence angle θ between the vertical plane M and the short side edge 225, and the range of the light incidence angle θ is from 0 to π/2. In this embodiment, the light incidence angle θ increases with the increase of the specific value μ. For example, when the length of the long side edge 221 is equal to that of the short side edge 222, μ is 1 and θ is π/4.

In the specific implementation process, above light incidence angle θ is cooperated with the default track of the reflection surface 222, whereby the lights projected to the reflection surface 222 by the light source 23 can be reflected by the reflection surface 222 and then uniformly enter into the optical film 21.

Figure 5:
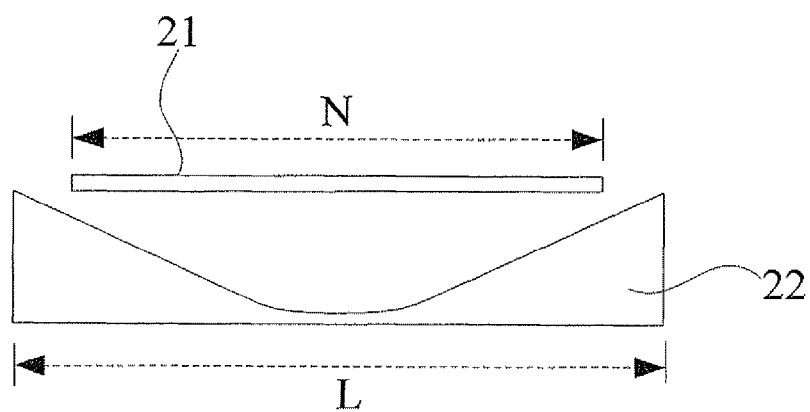
FIG. 5 is a cross sectional schematic view along a line B-B' shown in FIG. 4, and FIG. 5 further shows the relative position of the optical film and the reflection member in the backlight module of the present invention.

Please refer to FIG. 5, FIG. 5 is a cross sectional schematic view along a line B-B' shown in FIG. 2, and FIG. 5 further shows the relative position of the optical film 21 and the reflection member 22. The length of the reflection member 22 is the length L of the long side edge 224 of the reflection surface 222. The optical film 21 has a length N. In this embodiment, the length L is greater than the length N, so that the light source 23 can be located above the reflection surface 222, and the lights from the light source 23 can be projected to the reflection surface 222.

The working principle of the preferred embodiment of the backlight module shown in FIG. 2 to FIG. 6 is as follows.

The four side edges of the reflection surface 222 of the reflection member 22 form four intersection positions, the light-emitting units (including the light source 23 and the reflection cover 24 in FIG. 3) are disposed at two opposite intersection positions, and the light-emitting surface 231 of the light source 23 faces the reflection cover 24 and the reflection surface 222.

When the light source 23 luminous, the lights emitted from the light source 23 are projected to the reflection cover 24 and the reflection surface 222. After the lights projected to the reflection cover 24 is reflected by the reflection cover 24, one portion of the lights directly enters into the optical film 21 (please refer to FIG. 3), and the other portion of the lights arrives at the reflection surface 222, and finally enters into the optical film 21 after being reflected by the reflection surface 222.

Because the reflection surface 222 is a free curved surface having the default track, and the light-emitting unit consisting of the reflection cover 24 and the light source 23 is positioned at one or more intersection positions, the lights directly projected to the reflection surface 222 by the light source 23 and the lights arriving at the reflection surface 222 after being reflected by the reflection cover 24 may all be reflected by the reflection surface 222 and then enter into the optical film 21.

Obviously, the present invention may adopt a less number of the light source 23, thereby not only reducing cost, but also saving space. Moreover, because the light source 23 adopts the LED to ensure the requirement of the luminous flux of the backlight module.

The present invention also provides a liquid crystal display, which comprises the backlight module provided by the present invention. The backlight module has been detail described in the above text, so no need to repeat it here.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A backlight module, comprising an optical film, a reflection member and two light-emitting units, each of the two light-emitting units including a light source and a reflection cover, the light source being long bar-shaped, the reflection member being located under the optical film and being parallel to the optical film, the reflection member including a reflection body and a reflection surface on the top of the reflection body, the reflection surface including multiple side edges, wherein the two light-emitting units are separately disposed on intersection positions of the side edges of the reflection surface, the light-emitting directions of the two light-emitting units face the reflection surface;

wherein the reflection surface is designed to be a free curved surface having a default track, the lights emitted from the two light-emitting units is capable of arriving at the reflection surface and then uniformly entering into the optical film after being reflected by the reflection surface;

wherein the light source includes a light-emitting surface, the light-emitting surface of the light source is perpendicular to a vertical plane being perpendicular to a planar bottom surface on the bottom of the reflection member; and wherein there forms a vertical distance from any point on the reflection surface to the vertical plane, and any point on the reflection surface has a height, relative to the planar bottom surface of the reflection member, wherein the height of any point on the reflection surface decreases with the increase of the vertical distance from it to the vertical plane, the downward trend of the height is greater on the position near the light source, and the downward trend of the height is slower on the position far from the light source.

2. The backlight module as claimed in claim 1, wherein the light-emitting surface is parallel to the optical film and faces the reflection cover and the reflection surface; and the reflection cover is used to reflect the lights coming from the light, source unto the reflection surface or the optical film.

3. The backlight module, as claimed in claim 2, wherein a top plane structure of the reflection surface is square, including two opposite parallel long side edges and two opposite parallel short, side edges, wherein the four side edges form four intersection positions;

the two light-emitting units are separately disposed at two opposite intersection positions of the four intersection positions.

4. The backlight module as claimed in claim 3, wherein there forms a light incidence angle between the vertical plane and the short side edge of the reflection surface, the range of the light, incidence angle is from 0 to $\pi/2$; the length of the short side edge and the length of the long side edge form a specific value;

the light incidence angle increases with the increase of the specific value.

5. A backlight module, comprising an optical film, a reflection member and at least one light-emitting unit, the reflection member being located under the optical film and being parallel to the optical film, the reflection member including a reflection body and a reflection surface on the top of the reflection body, the reflection surface including multiple side edges, wherein the light-emitting unit is disposed on one intersection position formed by the side edges of the reflection surface, a light-emitting direction of the light-emitting unit faces the reflection surface;

wherein the reflection surface is designed to be a free curved surface having a default track, the lights emitted from the light-emitting unit is capable of arriving at the reflection surface and then uniformly entering into the optical film after being reflected by the reflection surface;

wherein the light-emitting unit includes a light source, the light source includes a light-emitting surface, and the light-emitting surface of the light source is perpendicular to a vertical plane being perpendicular to a planar bottom surface on the bottom of the reflection member; and wherein there has a vertical distance from any point on the reflection surface to the vertical plane, and any point on the reflection surface has a height relative to the planar bottom surface of the reflection member, wherein the height of any point on the reflection surface decreases with the increase of the vertical distance, the downward trend of the height is greater on the position near the light source, and the downward trend of the height is slower on the position far from the light source.

6. The backlight module as claimed in claim 5, wherein the light-emitting unit includes a reflection cover:

the light emitting surface is parallel to the optical film and faces the reflection cover and the reflection surface and the reflection cover is used to reflect the lights coming from the light source unto the reflection surface or the optical film.

7. The backlight module as claimed in claim 6, wherein a top plane structure of the reflection surface is square, including two opposite parallel long side edges and two opposite parallel short side edges, wherein the four side edges form four intersection positions;

the backlight module includes two light-emitting units, which are separately disposed at two opposite intersection positions of the four intersection positions.

8. The backlight module as claimed in claim 7, wherein the light source is a long bar-shaped; there forms a light incidence angle between the vertical plane and the short side edge of the reflection surface, the range of the light incidence angle is from it to $\pi/2$; the length of the short side edge and the length of the long side edge form a specific value;

the light incidence angle increases with the increase of the specific value.

9. A liquid crystal display, comprising a backlight module, which comprises an optical film, a reflection member and at least one light-emitting unit, the reflection member being located under the optical film and being parallel to the optical film, the reflection member including a reflection body and a reflection surface on the top of the reflection body, the reflection surface including multiple side edges, wherein the light-emitting unit is disposed on one intersection position formed by the side edges of the reflection surface, a light-emitting direction of the light-emitting unit faces the reflection surface;

wherein the reflection surface is designed to be a free curved surface having a default track, the lights emitted from the light-emitting unit is capable of arriving at the reflection surface, and then uniformly entering into the optical film after being reflected by the reflection surface;

wherein the light-emitting unit includes a light source, the light source includes a light-emitting surface, and the light-emitting surface of the light source is perpendicular to a vertical plane being perpendicular to a planar bottom surface on the bottom of the reflection member; and wherein there has a vertical distance from any point on the reflection surface to the vertical plane, and any point on the reflection surface has a height relative to the planar bottom surface of the reflection member, wherein the height of any point on the reflection surface decreases with the increase of the vertical distance, the downward trend of the height is greater on the position near the light source, and the downward trend of the height is slower on the position far from the light source.

10. The liquid crystal display as claimed in claim 9, wherein the light-emitting unit includes a reflection cover;
 the light-emitting surface is parallel to the optical film and faces the reflection cover and the reflection surface; and
 the reflection cover is used to reflect the lights coming from the light source unto the reflection surface or the optical film.

11. The liquid crystal display as claimed in claim 10, wherein a top plane structure of the reflection surface is square, including two opposite parallel long side edges and two opposite parallel short side edges, wherein the four side edges form four intersection positions;
 the backlight module includes two light-emitting units, which are separately disposed at two opposite intersection positions of the four intersection positions.

12. The liquid crystal display as claimed in claim 11, wherein the light source is a long bar-shaped; there forms a light incidence angle between the vertical plane and the short side edge of the reflection surface, the range of the light incidence angle is from 0 to $\pi/2$; the length of the short side edge and the length of the long side edge form a specific value;
 the light incident increases with the increase of the specific value.

* * * * *

UNITED STATES PATENT AND TRADEMARK OFFICE
CERTIFICATE OF CORRECTION

PATENT NO.         : 9,116,388 B2
APPLICATION NO.    : 13/511702
DATED              : August 25, 2015
INVENTOR(S)        : Kuojun Fang Page 1 of 1

It is certified that error appears in the above-identified patent and that said Letters Patent is hereby corrected as shown below:

In the claims:

Claim 8 line 32 should be corrected as follows:
Change
    -- from it to --
    to
    "from 0 to"

Signed and Sealed this
Twenty-sixth Day of January, 2016

Michelle K. Lee
*Director of the United States Patent and Trademark Office*